(12) United States Patent
Zeng

(10) Patent No.: US 9,196,153 B2
(45) Date of Patent: Nov. 24, 2015

(54) REMOTE WIRELESS MOTOR CONTROL LAW PROCESSING SYSTEM

(71) Applicant: The Boeing Company, Chicago, IL (US)

(72) Inventor: Peng Zeng, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 264 days.

(21) Appl. No.: 13/891,456

(22) Filed: May 10, 2013

(65) Prior Publication Data

US 2014/0333233 A1 Nov. 13, 2014

(51) Int. Cl.
*G08C 17/02* (2006.01)
*H02P 6/00* (2006.01)
*G08C 23/04* (2006.01)

(52) U.S. Cl.
CPC ............. *G08C 17/02* (2013.01); *G08C 23/04* (2013.01); *H02P 6/00* (2013.01); *G08C 2201/50* (2013.01)

(58) Field of Classification Search
USPC ................................ 318/16; 340/1.1, 2.1, 3.1
See application file for complete search history.

(56) References Cited

U.S. PATENT DOCUMENTS

| 4,116,321 | A | * | 9/1978 | Miller .................. 192/103 F |
| 4,206,395 | A | | 6/1980 | Okuyama et al. |
| 6,925,807 | B2 | * | 8/2005 | Jones et al. .................. 60/721 |
| 8,884,562 | B1 | | 11/2014 | Cameron |
| 2003/0038609 | A1 | | 2/2003 | Shien |
| 2011/0031915 | A1 | | 2/2011 | Seever |
| 2011/0262112 | A1 | | 10/2011 | Tanaka et al. |
| 2014/0306628 | A1 | | 10/2014 | Benson et al. |
| 2014/0354199 | A1 | | 12/2014 | Zeng et al. |

FOREIGN PATENT DOCUMENTS

| DE | 102008037610 A1 | 7/2009 |
| WO | WO2004110093 A1 | 12/2004 |

OTHER PUBLICATIONS

Cameron, "Current Control in Brushless DC Motors," U.S. Appl. No. 13/303,673, filed Nov. 23, 2011, 43 pages.
Benson et al., "Electric Motor Frequency Modulation System," U.S. Appl. No. 13/860,720, filed Apr. 11, 2013, 49 pages.
Extended European Search Report, dated Jan. 27, 2015, regarding Application No. EP14157042.4, 7 pages.
International Search Report and Written Opinion, dated Mar. 12, 2015, regarding Application No. PCT/US2014/069154, 11 pages.
Godoy et al., "Using Serial Bluetooth Converters as a Sensor Link in Networked Control Systems," 9th IEEE International Conference on Control and Automation (ICCA), Dec. 2011, pp. 461-466.
Umirov et al., "Applicability of ZigBee for Real-Time Networked Motor Control Systems," International Conference on Control, Automation and Systems, Oct. 2008, pp. 2937-2940.
Zeng et al., "Wirelessly Powered Electric Motor", U.S. Appl. No. 14/199,272, filed Mar. 6, 2014, 49 pages.
Office Action, dated Jul. 2, 2015, regarding U.S. Appl. No. 14/199,272, 20 pages.

* cited by examiner

*Primary Examiner* — Bentsu Ro
(74) *Attorney, Agent, or Firm* — Yee & Associates, P.C.

(57) ABSTRACT

A method and apparatus for operating an electric motor unit. Information is received from the electric motor unit over a wireless communications link between the controller and the electric motor unit. Commands are identified for the electric motor unit from the information received. The commands identified are sent to the electric motor unit over the wireless communications link.

20 Claims, 5 Drawing Sheets

REMOTE WIRELESS MOTOR CONTROL LAW PROCESSING SYSTEM

BACKGROUND INFORMATION

1. Field

The present disclosure relates generally to electric motor systems and, in particular, to controlling electric motor systems. Still more particularly, the present disclosure relates to a method and apparatus for controlling the operation of electric motor units in electric motor systems.

2. Background

An electric motor is a device that converts electrical power into mechanical power. Electric motors are used for various applications. These applications include fans, pumps, tools, disk drives, drills, and other types of devices that may be found in these and other types of platforms. One type of electric motor that has become more commonly used is a brushless electric motor. This type of motor may be operated using direct current.

A brushless electric motor may be controlled through a device such as a microcontroller. A microcontroller may implement control laws to control the operation of the brushless electric motor. In particular, the control laws may be used to increase efficiency and operation of this type of electric motor.

Control laws may become more complicated, larger in number, or both, to obtain a desired efficiency for a brushless electric motor. As control laws become more complicated and larger in number, the microcontroller implementing the control laws also may become more complicated.

For example, a higher density circuit board, a larger circuit board, additional cooling, and changes may be needed. These changes may increase the weight, size, heat generation, energy use, or some combination thereof for the entire electric motor system as a whole. Further, the cooling system needed for additional cooling also uses more energy to cool the controller. As a result, the amount of energy used by the electric motor system also may increase more than desired.

Further, depending on the particular implementation, a more complex microcontroller, more than one microcontroller, or both processing the control laws may be present. As a result, higher density or larger circuit boards may be used to implement the microcontroller.

These more complex microcontrollers also may result in the use of components that have higher costs. As a result, the cost of the electric motor system may increase more than desired as compared to the benefits.

Additional microcontrollers may be used for redundancy in case one microcontroller does not operate as desired. If the second redundancy is not present, incorrectly operating microcontrollers may cause inconsistency in an electric motor that may require maintenance. This maintenance may include repair or replacement of the electric motor.

With the addition of more microcontrollers, additional heat, weight, space, and energy use may occur. These increases may not be feasible for some applications in which one or more of these factors are a concern.

With more complex microcontrollers, the use of additional microcontrollers, or both, cooling systems may become more complex, larger, or both to sufficiently cool the microcontrollers. These cooling systems also may use more energy than desired.

This type of additional redundancy, however, increases weight, size, heat generation, and electricity used. As a result, the type of systems may not be as desirable when lower weight, smaller size, lower heat generation, lower energy use, or some combination thereof is desired.

One solution may involve using materials that may reduce some of these factors. These materials, however, may be more expensive than desired. As a result, these types of electric motor systems may not be usable in different applications where weight, size, heat generation, energy use, or some combination thereof is of concern.

With the use of more complex microcontrollers, these microcontrollers may be more susceptible to electromagnetic interference. Electric motors generate electromagnetic interference that may affect the operation of these types of microcontrollers.

Therefore, it would be desirable to have a method and apparatus that take into account at least some of the issues discussed above, as well as other possible issues.

SUMMARY

An embodiment of the present disclosure provides an apparatus comprising a controller. The controller is configured to receive information from an electric motor unit over a wireless communications link between the controller and the electric motor unit. The controller is further configured to identify commands for the electric motor unit from the information received. The controller is still further configured to send the commands identified to the electric motor unit over the wireless communications link.

Another embodiment of the present disclosure provides an electric motor system comprising an electric motor unit in a first location and a controller in a second location. The controller is configured to receive information from the electric motor unit over a communications link between the controller and the electric motor unit. The controller is further configured to identify commands for the electric motor unit from the information received. The controller is still further configured to send the commands identified to the electric motor unit over the communications link.

Yet another embodiment of the present disclosure provides a method for operating an electric motor unit. Information is received from the electric motor unit over a wireless communications link between the controller and the electric motor unit. Commands are identified for the electric motor unit from the information received. The commands identified are sent to the electric motor unit over the wireless communications link.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that currently, a controller is in the same location as an electric motor. In other words, the controller and the electric motor may be in the same physical unit. The illustrative embodiments recognize and take into account that the controller may be placed in a remote location from the electric motor. In this manner, the electric motor may be placed in the location where factors such as at least one of weight, size, heat generation, energy use, or other suitable considerations, are crucial.

As used herein, the phrase "at least one of,", when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A, one of item B, and ten of item C; four of item B and seven of item C; and other suitable combinations. The item may be a particular object, thing, or a category. In other words, at least one of means any combination of items and number of items may be used from the list but not all of the items in the list are required.

The illustrative embodiments recognize and take into account that the separation of the controller from the electric motor is different from currently used systems where an operator uses a remote control. These types of systems allow for a remote user input but the controller with the control laws is still in the same location as the electric motor.

The illustrative embodiments provide a method and apparatus for operating an electric motor unit. In one illustrative embodiment, an apparatus comprises a controller configured to receive information from an electric motor unit over a wireless communications link between the controller and the electric motor unit, identify commands for the electric motor unit from the information received, and send the commands identified to the electric motor unit wirelessly over the wireless communications link.

Figure 1:
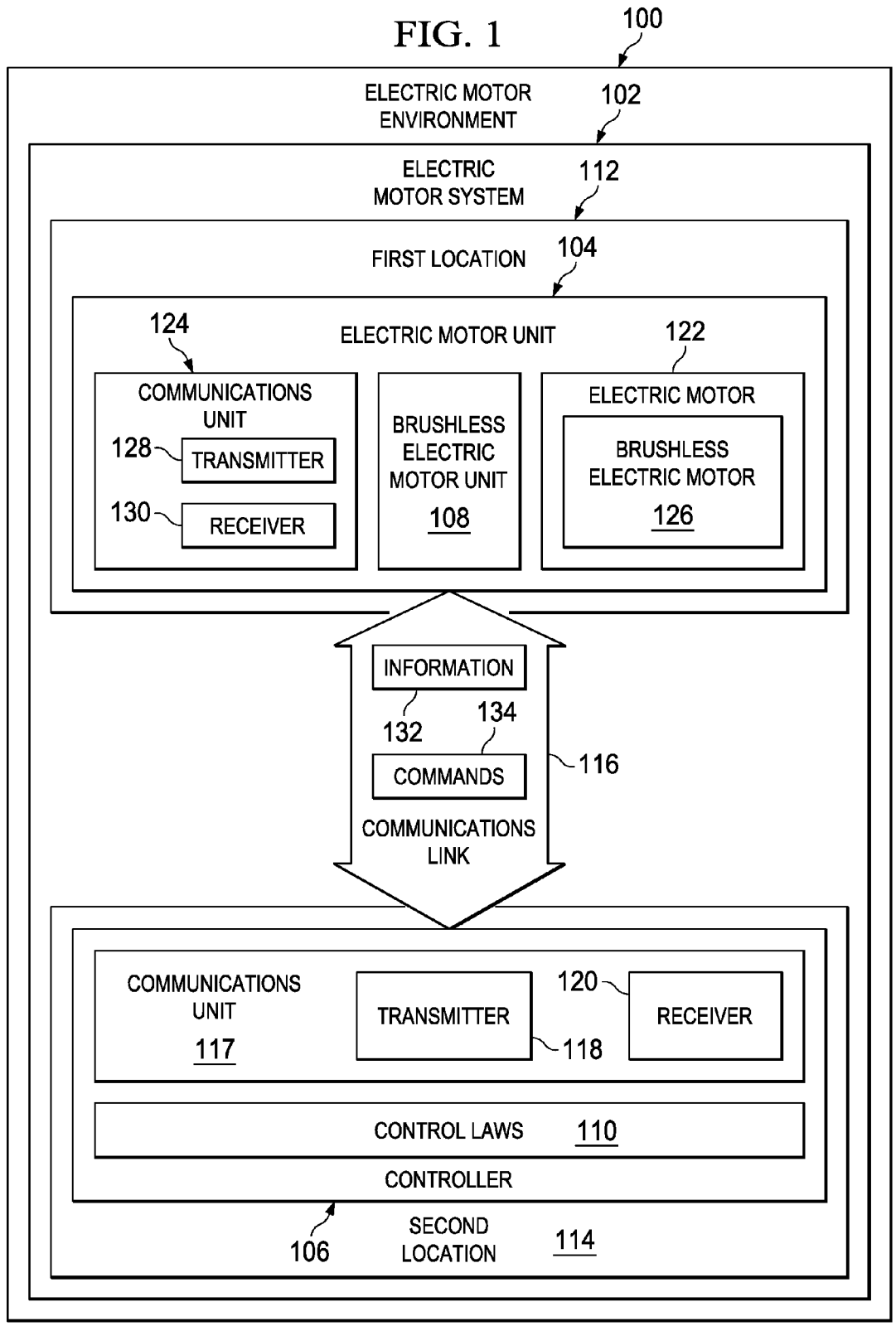
FIG. 1 is an illustration of an electric motor environment in the form of a block diagram in accordance with an illustrative embodiment.

With reference now to the figures and, in particular, with reference to FIG. 1, an illustration of an electric motor environment is depicted in the form of a block diagram in accordance with an illustrative embodiment. Electric motor environment 100 is an example of an environment in which an illustrative embodiment may be implemented.

Electric motor system 102 in electric motor environment 100 includes a number of different components. As depicted, electric motor system 102 includes electric motor unit 104 and controller 106.

Electric motor unit 104 is configured to generate rotary or linear torque or force. In this illustrative example, electric motor unit 104 may take the form of brushless electric motor unit 108.

Controller 106 is a hardware device in these illustrative examples. Controller 106 may include software. The hardware may include circuits that operate to perform the operations in controller 106. In this illustrative example, controller 106 may take the form of an impulse width modulation controller (IWMC) that modulates a switching frequency, among many other things such as switch timing and logic, used to drive switches in the form of transistors that control the current sent to electric motor unit 104. In particular, controller 106 controls the operation of electric motor unit 104.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and/or may be comprised entirely of organic components excluding a human being. For example, the processes may be implemented as circuits in organic semiconductors.

In this illustrative example, a group of control laws 110 are present in controller 106. The group of control laws 110 is one or more processes, functions, or some other mechanism configured to control the operation of electric motor unit 104. As depicted, the group of control laws 110 may be implemented in hardware, software, or some combination of the two.

The group of control laws 110 may be used to control operation of electric motor unit 104 in a desired manner. A "group of," as used herein with reference to items, means one or more items. For example, a group of control laws 110 is one or more control laws. As depicted, electric motor unit 104 is located in first location 112. Controller 106 is located in second location 114. First location 112 may be a remote location to second location 114.

In these illustrative examples, the placement of electric motor unit 104 in first location 112 and controller 106 in second location 114 allows for electric motor unit 104 to be reduced by at least one of weight, size, heat generation, or energy use as compared to currently designed electric motors. Different components affecting these factors with respect to controller 106 are in a different location from electric motor unit 104. In other words, circuits and cooling systems for controller 106 are in second location 114 rather than with electric motor unit 104 in first location 112.

In this illustrative example, electric motor unit 104 and controller 106 communicate using communications link 116. Communications link 116 may take various forms in different illustrative examples. For example, communications link 116 may be selected from one of a wireless communications link, a wired communications link, an optical communications link, and other suitable types of communications links.

In addition to the group of control laws 110, controller 106 also includes communications unit 117. Communications unit 117 includes transmitter 118 and receiver 120. In this particular example, electric motor unit 104 includes electric motor 122 and communications unit 124. Electric motor 122 may be brushless electric motor 126. As depicted, communications unit 124 includes transmitter 128 and receiver 130.

During operation, transmitter 128 in communications unit 124 for electric motor unit 104 is configured to send information 132 to controller 106 over communications link 116. Receiver 120 in communications unit 124 for controller 106 is configured to receive information 132 transmitted by electric motor unit 104. Information 132 may be, for example, speed, voltage, current, temperature, or other information that may be generated by sensors in or associated with electric motor 122.

Information 132 is any information that is used by the group of control laws 110 to control the operation of electric motor unit 104 and, in particular, the operation of electric motor 122 in electric motor unit 104. Information 132 by receiver 120 is used by the group of control laws 110 to generate commands 134 for electric motor unit 104 from information 132 received from electric motor unit 104. Controller 106 is configured to send commands 134 identified by the group of control laws 110 in controller 106 over communications link 116. For example, commands 134 may be sent wirelessly over a wireless communications link.

In this manner, electric motor system 102 may provide for at least one of reduced weight, size, heat generation, or energy use by electric motor unit 104. In these illustrative examples, electromagnetic interference in controller 106, electric motor unit 104, or both also may be reduced with electric motor unit 104 being in first location 112 and controller 106 being in second location 114. First location 112 and second location 114 may be selected to reduce electromagnetic interference.

As can be seen, electric motor system 102 with electric motor unit 104 in first location 112 and controller 106 in second location 114 reduces issues regarding weight, size, heat generation, energy use, or other suitable considerations for first location 112. The components that may affect these considerations are within controller 106 in second location 114 in this illustrative example. This is in contrast to currently available electric motor systems that have remote control input in which user input is received at a device and transmitted wirelessly to a controller that is located in the same location as the electric motor unit. In other words, currently used electric motor systems may allow for remote input from an operator. However, the control laws are implemented in the same location as the electric motor unit.

Additionally, electric motor system 102 also may have reduced issues with respect to electromagnetic interference with the placement of electric motor unit 104 in first location 112 and controller 106 in second location 114. Further, the size of electric motor unit 104 is reduced because components in controller 106 are not located in electric motor unit 104. As a result, additional flexibility in the placement of electric motor unit 104 may be present. For example, by reducing the size of electric motor unit 104, electric motor unit 104 may be used in more locations based on the reduced size when the locations have space considerations with respect to electric motor systems. In this illustrative example, electric motor system 102 may be a remote wireless motor control law processing system.

The illustration of electric motor environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, controller 106 may be configured to control one or more electric motor units in addition to electric motor unit 104. In still other illustrative examples, one or more controllers in addition to controller 106 may be used to control electric motor unit 104 or one or more electric motor units in addition to or in place of electric motor unit 104.

In other illustrative examples, one or more electric motor units may be controlled by controller 106 in addition to or in place of electric motor unit 104. In still other illustrative examples, more controllers may be used with or in place of controller 106 to control electric motor unit 104 along with any other electric motor units that may be present in electric motor system 102 in electric motor environment 100. With multiple controllers, redundancy may be provided for electric motor system 102.

Further, controller 106 may take other forms other than an impulse width modulation controller. For example, controller 106 also may be a pulse width modulation controller in some illustrative examples.

Figure 2:
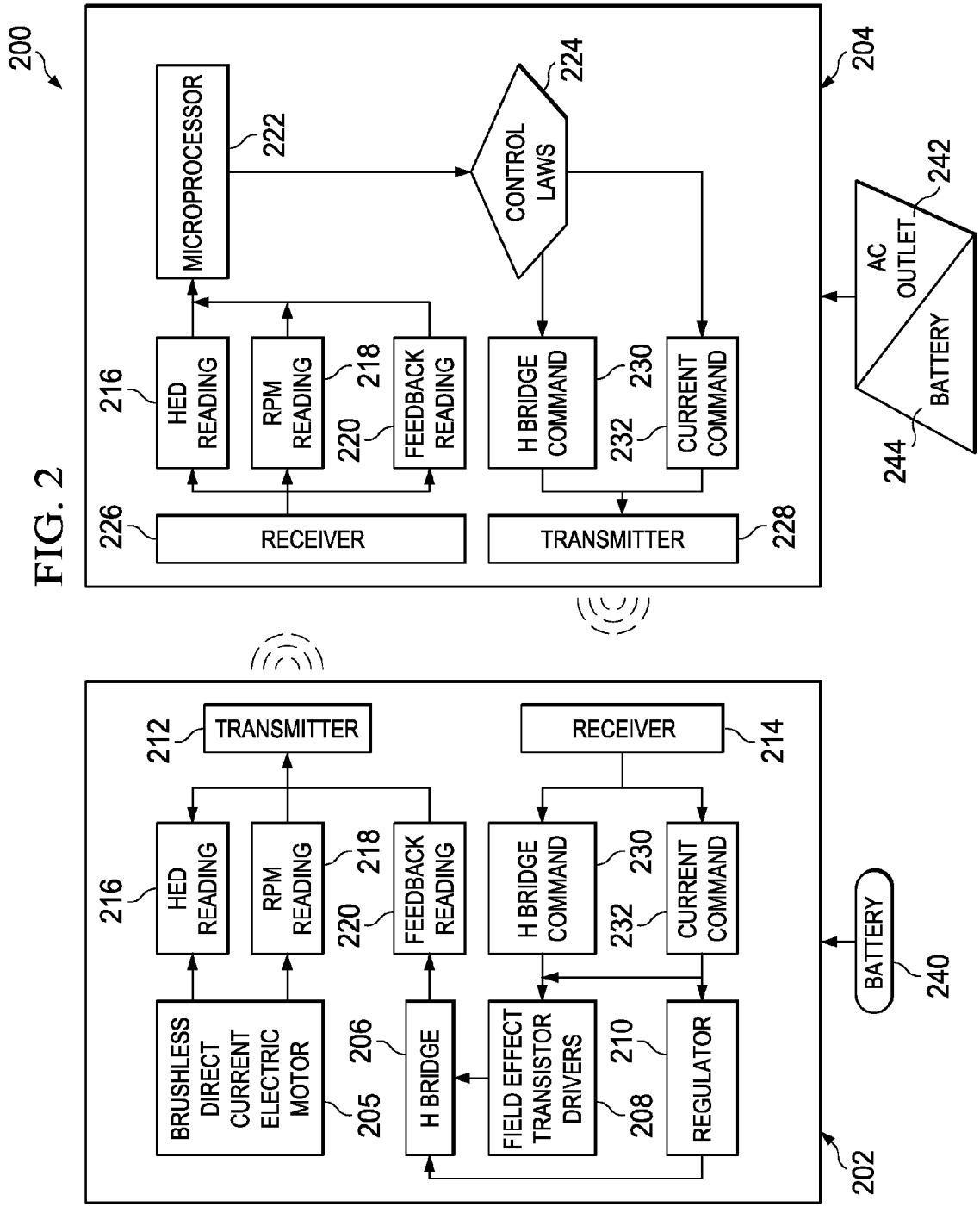
FIG. 2 is an illustration of an electric motor system in the form of a block diagram in accordance with an illustrative embodiment.

With reference next to FIG. 2, an illustration of an electric motor system is depicted in the form of a block diagram in accordance with an illustrative embodiment. Electric motor system 200 is an example of one implementation for electric motor system 102 in FIG. 1. In this illustrative example, electric motor system 200 includes electric motor unit 202 and controller 204. Controller 204 includes control law circuits.

In this illustrative example, electric motor unit 202 includes power and mechanical components. As depicted, electric motor unit 202 includes brushless direct current (DC) electric motor 205, H bridge 206, field effect transistor (FET) drivers 208, regulator 210, transmitter 212, and receiver 214.

In this illustrative example, H bridge 206, field effect transistor (FET) drivers 208, and regulator 210 are circuits that cause electric motor unit 202 to rotate in a desired direction with a desired speed. The direction and speed of the rotation of electric motor unit 202 occurs in response to commands received from controller 204. In this illustrative example, controller 204 contains the circuitry that generates the commands.

As depicted, Hall effect device (HED) reading 216, revolutions per minute (RPM) reading 218, and feedback reading 220 are examples of information that are sent wirelessly by transmitter 212 to controller 204. Hall effect device (HED) reading 216 and revolutions per minute (RPM) reading 218 are information that may be generated from sensors in brushless direct current (DC) electric motor 205. A Hall effect device may be used to provide information such as angular position of electric motor unit 202. In these illustrative examples, feedback reading 220 may include information such as current, voltage, and other suitable information from H bridge 206. Feedback reading 220 may be information that may be used by controller 204 to control operation of electric motor unit 202.

As depicted, controller 204 includes microprocessor 222 in which control laws 224 are implemented as software. Additionally, controller 204 also includes receiver 226 and transmitter 228. Receiver 226 is configured to receive Hall effect device (HED) reading 216, revolutions per minute (RPM) reading 218, and feedback reading 220 sent wirelessly by electric motor unit 202.

As depicted, control laws 224 are configured to identify commands, such as H bridge command 230 and current command 232. These commands are sent by transmitter 228 wirelessly to electric motor unit 202. Receiver 214 in electric motor unit 202 receives H bridge command 230 and current command 232. As depicted, H bridge command 230 may be used by field effect transistor (FET) drivers 208 to adjust the frequency at which brushless direct current (DC) electric motor 205 operates, as well as which switches to close and open on H bridge 206 and when the switches close and open. Current command 232 is used by regulator 210 to adjust the amount of current sent to brushless direct current (DC) electric motor 205 by H bridge 206. In summary, H bridge command 230 dictates "which switches close and open" and when those switches "close and open." Current command 232 dictates the "for how long the switches are closed and opened." How long the switches are closed and open may be referred to as the duty cycle.

In this illustrative example, electric motor unit 202 is powered by battery 240. Controller 204 is connected to alternating current (AC) outlet 242. Additionally, battery 244 may serve as a backup or alternate power source for controller 204. In some cases, battery 244 may be used in place of the connection to alternating current outlet 242. Of course, depending on implementation, electric motor unit 202 also may be connected to an alternating current outlet or other electrical energy source.

Figure 3:
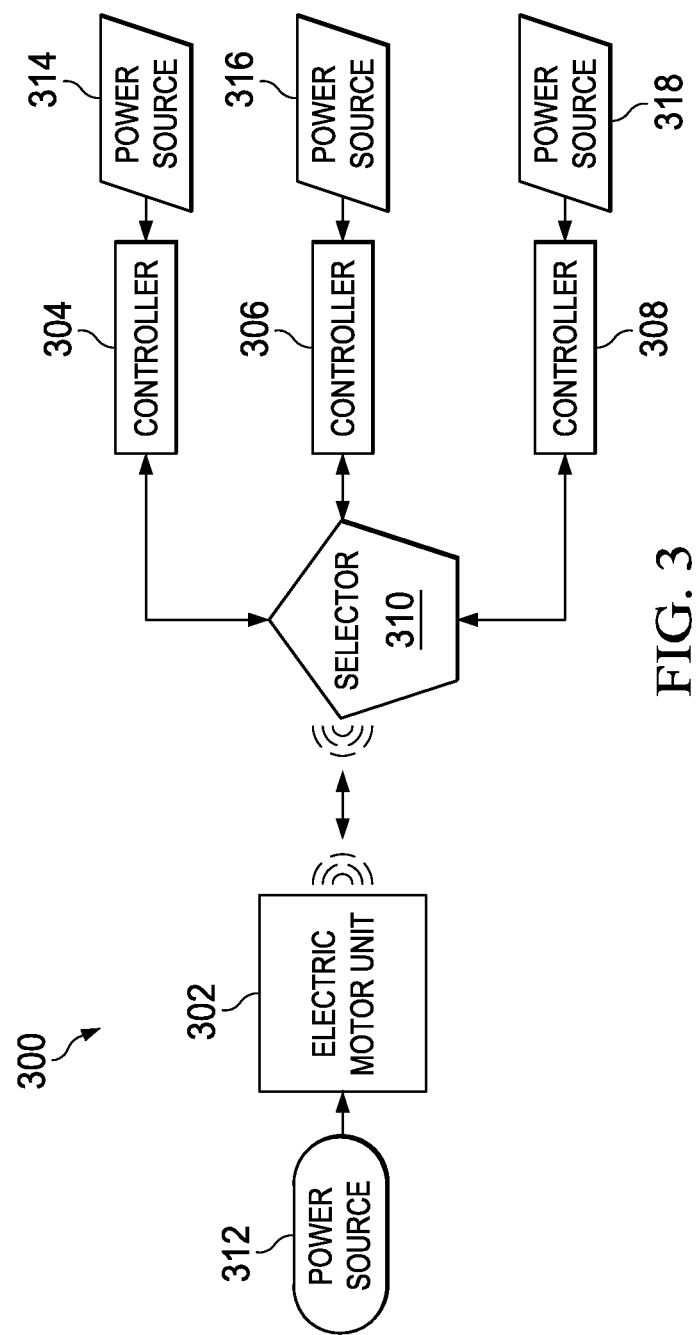
FIG. 3 is another illustration of an electric motor system in accordance with an illustrative embodiment.

With reference now to FIG. 3, another illustration of an electric motor system is depicted in accordance with an illustrative embodiment. Electric motor system 300 is an example of one implementation for electric motor system 102 in FIG. 1.

In this illustrative example, electric motor system 300 includes electric motor unit 302, controller 304, controller 306, controller 308, and selector 310. Electric motor unit 302 is connected to power source 312. Controller 304 is connected to power source 314, controller 306 is connected to power source 316, and controller 308 is connected to power source 318. These power sources may take various forms. For example, a power source may include at least one of a battery, an alternating current source, or some other suitable type of power source. In some illustrative examples, these power sources may be the same rather than different power sources depending on the particular implementation.

In this illustrative example, information generated by electric motor unit 302 is sent to controller 304, controller 306, and controller 308 through selector 310. In other words, selector 310 may include a communications unit that communicates back and forth wirelessly with electric motor unit 302. In other words, selector 310 send commands and receives data in which bidirectional communication is present between selector 310, controller 304, controller 306, and controller 308.

As depicted, controller 304, controller 306, and controller 308 are a plurality of controllers and may all generate commands for electric motor unit 302. These commands are sent to selector 310. Selector 310 selects commands from one of controller 304, controller 306, and controller 308 to send to electric motor unit 302. In this illustrative example, electric motor unit 302 may be implemented using electric motor unit 202 in FIG. 2. Selector 310 may be a voter resolution unit. In other words, selector 310 selects a set of commands from one of the controllers to send to electric motor unit 302. For example, selector 310 may compare the commands from controller 304, controller 306, and controller 308. If a difference is present, selector 310 may select a command with a greatest number of matches from the controllers. A controller operating in an undesired manner may generate commands that are different from other controllers operating as desired.

In this manner, undesired commands that may be sent to electric motor unit 302 may be avoided with selector 310. In some cases, commands may be averaged or combined rather than merely selected.

In this manner, the configuration of controllers in electric motor system 300 may provide for redundancy. This redundancy may take into account that one of controller 304, controller 306, and controller 308 may not always operate as desired. In this manner, undesired operation of electric motor unit 302 may be avoided. In this manner, controllers, such as controller 304, controller 306, controller 308 may be provided for redundancy but may be in a location remote to electric motor unit 302. As a result, the weight, bulk, size, heat, and other factors with respect to the controllers do not affect electric motor unit 302. As a result, electric motor unit 302 may be placed in locations not possible currently available for existing electric motor systems.

Figure 4:
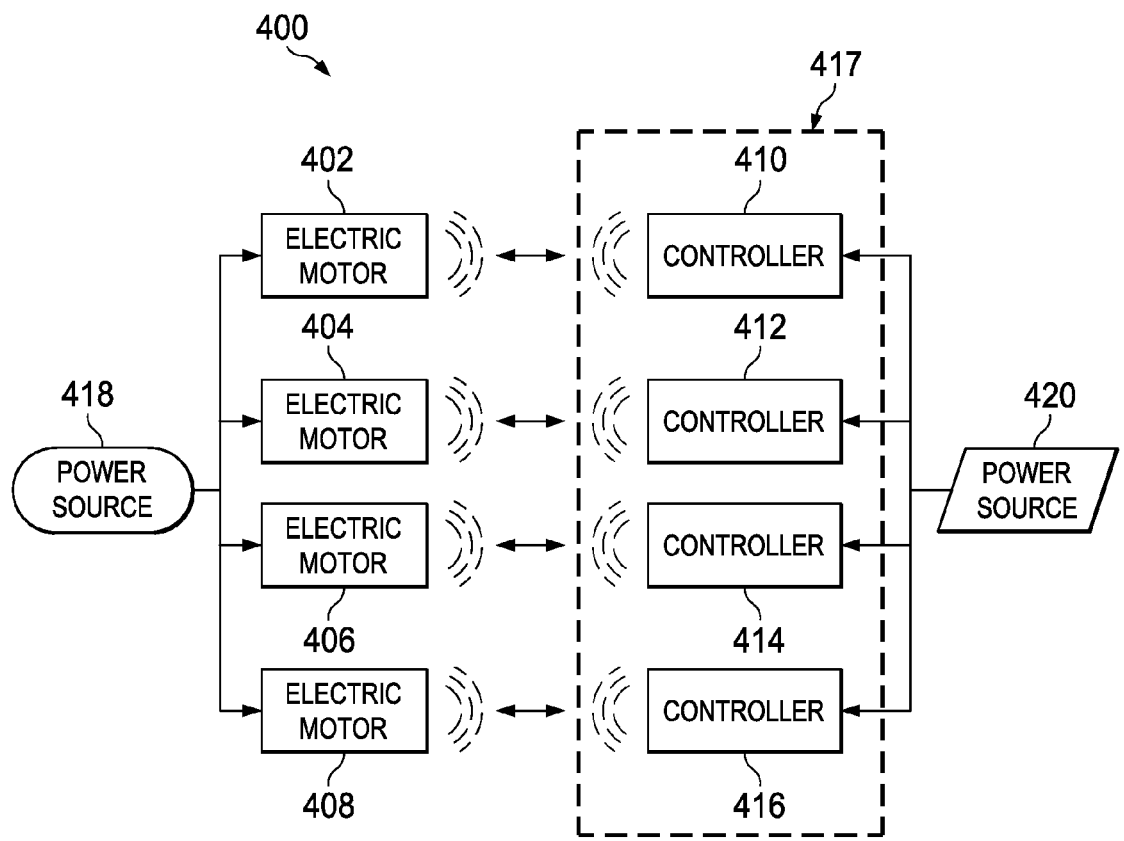
FIG. 4 is yet another illustration of an electric motor system in accordance with an illustrative embodiment.

Turning next to FIG. 4, yet another illustration of an electric motor system is depicted in accordance with an illustrative embodiment. In this depicted example, electric motor system 400 includes electric motor 402, electric motor 404, electric motor 406, electric motor 408, controller 410, controller 412, controller 414, and controller 416. As depicted, electric motor 402, electric motor 404, electric motor 406, and electric motor 408 are connected to power source 418.

In this illustrative example, controller 410, controller 412, controller 414, and controller 416 may form command center 417. Command center 417 is configured to control the operation of electric motor 402, electric motor 404, electric motor 406, and electric motor 408. As depicted, controller 410, controller 412, controller 414, and controller 416 are connected to power source 420. Each of these power sources may be a battery, an alternating current power source, or some other suitable type of power source.

In this illustrative example, each of the controllers may be assigned to control one or more electric motors. Further, the different controllers may act as backups or failovers in case other controllers do not operate as desired.

For example, electric motor 402, electric motor 404, electric motor 406, and electric motor 408 may be actuators that may be moved to control movement of other structures. For example, these electric motors may be actuators for control surfaces in an aircraft. In other illustrative examples, these electric motors may be actuators for a robotic arm. In the illustrative example, electric motor 402 may be able to recover from errors that may occur from commands generated by controller 410. Electric motor 404 may be a critical actuator that cannot operate with an incorrect command. Further, in this illustrative example, electric motor 406 and electric motor 408 may not move until after electric motor 402 and electric motor 404 have moved.

As depicted, controller 410 controls electric motor 402. Controller 412 controls electric motor 404. Controller 414 and controller 416 may assist in controlling electric motor 404 because electric motor 406 and electric motor 408 may not move until after electric motor 402 and electric motor 404 have moved. In this manner, electric motor 404 may have a desired amount of redundancy because electric motor 404 is not as tolerant of commands that may cause undesired movement.

In this particular example, after electric motor 402 and electric motor 404 have moved, controller 414 controls electric motor 406 and controller 416 controls electric motor 408. Depending on the redundancy desired, controller 410 and controller 412 may also aid in operating electric motor 408.

In this manner, the components that may add to the bulkiness of an electric motor system are located in a location away from the electric motors themselves. As a result, electric motor system 400 may be especially suited for use where space may be of concern such as in a robotic arm. Other features are provided such as a reduction in weight, heat, and other factors with electric motor system 400 and the use of command center 417. Another implementation may include implementing electric motor system 400 in prosthetic or bionic limbs, such as an arm, a leg, a hand, or some other suitable implementation. In this manner, the plurality of controllers is configured to control operation of a number of electric motor units in the plurality of electric motor units over a plurality of wireless communications links shown in this figure.

The illustration of the different configurations for electric motor systems in FIGS. 2-4 are not meant to limit the manner in which other illustrative embodiments may be implemented. Electric motor system 200, electric motor system 300, and electric motor system 400 have been provided for purposes of illustrating some examples of how an electric motor system may be implemented in accordance with an illustrative embodiment.

For example, other electric motor systems may include other numbers of electric motors other than the four electric motors shown in FIG. 4. For example, three electric motors, seven electric motors, or some other number of electric motors may be used. Further, other numbers of controllers may be present. For example, six controllers may be used instead of four controllers used to control the four electric motors illustrated in FIG. 4.

As another illustrative example, other types of indications may be used other than wireless communications. Although radiofrequency signals may be used, other types of signaling may also be used. For example, optical signals that travel through an interface or optical cable may be used.

Figure 5:
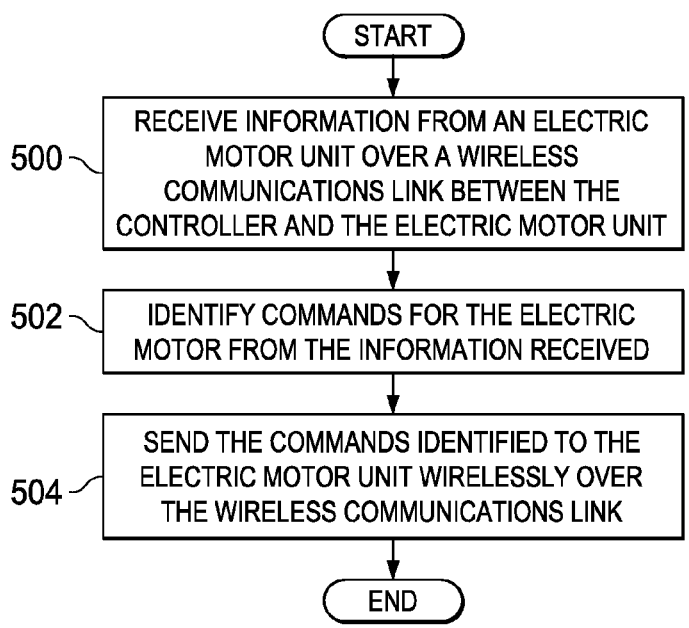
FIG. 5 is an illustration of a flowchart of a process for operating an electric motor unit in accordance with an illustrative embodiment.

With reference now to FIG. 5, an illustration of a flowchart of a process for operating an electric motor unit is depicted in accordance with an illustrative embodiment. The process illustrated in FIG. 5 may be implemented in electric motor system 102 in FIG. 1. In particular, some or all of these operations may be implemented in a group of control laws 110 in controller 106.

The process begins by receiving information from an electric motor unit over a wireless communications link between the controller and the electric motor unit (operation 500). Next, commands are identified for the electric motor from the information received (operation 502). The process then sends the commands identified to the electric motor unit wirelessly over the wireless communications link (operation 504), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 6:
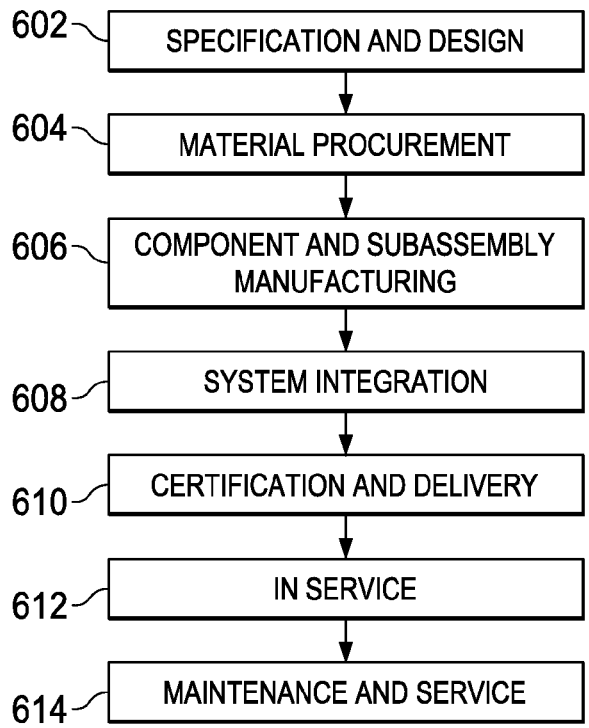
FIG. 6 is an illustration of an aircraft manufacturing and service method in the form of a block diagram in accordance with an illustrative embodiment.
Figure 7:
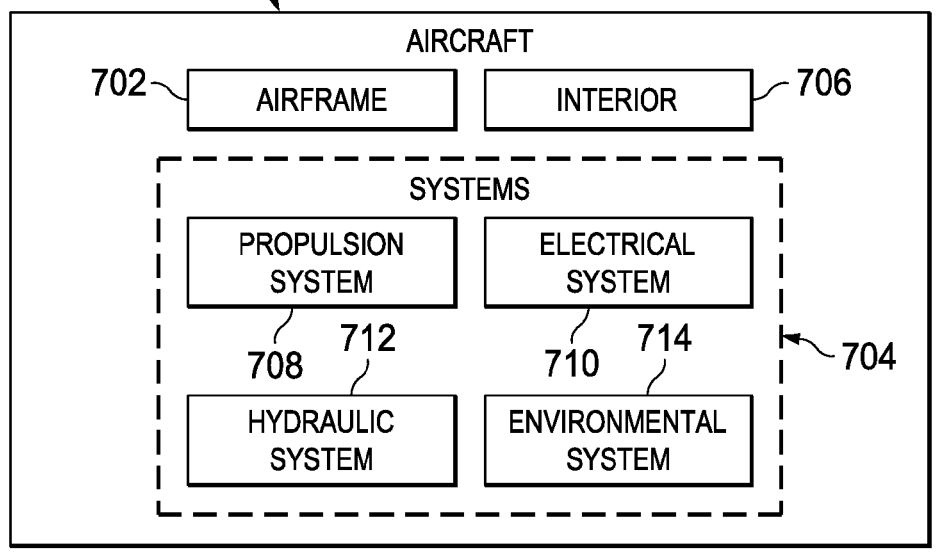
FIG. 7 is an illustration of an aircraft in the form of a block diagram in which an illustrative embodiment may be implemented.

The illustrative embodiments of the disclosure may be described in the context of aircraft manufacturing and service method 600 as shown in FIG. 6 and aircraft 700 as shown in FIG. 7. Turning first to FIG. 6, an illustration of an aircraft manufacturing and service method is depicted in the form of a block diagram in accordance with an illustrative embodiment. During pre-production, aircraft manufacturing and service method 600 may include specification and design 602 of aircraft 700 in FIG. 7 and material procurement 604.

During production, component and subassembly manufacturing 606 and system integration 608 of aircraft 700 in FIG. 7 takes place. Thereafter, aircraft 700 in FIG. 7 may go through certification and delivery 610 in order to be placed in service 612. While in service 612 by a customer, aircraft 700 in FIG. 7 is scheduled for routine maintenance and service 614, which may include modification, reconfiguration, refurbishment, and other maintenance or service.

Each of the processes of aircraft manufacturing and service method 600 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 7, an illustration of an aircraft is depicted in the form of a block diagram in which an illustrative embodiment may be implemented. In this example, aircraft 700 is produced by aircraft manufacturing and service method 600 in FIG. 6 and may include airframe 702 with systems 704 and interior 706. Examples of systems 704 include one or more of propulsion system 708, electrical system 710, hydraulic system 712, and environmental system 714. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 600 in FIG. 6.

In one illustrative example, components or subassemblies produced in component and subassembly manufacturing 606 in FIG. 6 may be fabricated or manufactured in a manner similar to components or subassemblies produced while aircraft 700 is in service 612 in FIG. 6. As yet another example, one or more apparatus embodiments, method embodiments, or a combination thereof may be utilized during production stages, such as component and subassembly manufacturing 606 and system integration 608 in FIG. 6. One or more apparatus embodiments, method embodiments, or a combination thereof may be utilized while aircraft 700 is in service 612 and/or during maintenance and service 614 in FIG. 6. The use of a number of the different illustrative embodiments may substantially expedite the assembly of and/or reduce the cost of aircraft 700.

In one illustrative example, components or subassemblies produced in component and subassembly manufacturing 606 in FIG. 6 may be fabricated or manufactured in a manner similar to components or subassemblies produced while aircraft 700 is in service 612 in FIG. 6. For example, electric motor systems may be manufactured for use in aircraft during one or more of these different stages.

As yet another example, one or more apparatus embodiments, method embodiments, or a combination thereof may be utilized during production stages, such as component and subassembly manufacturing 606 and system integration 608 in FIG. 6. As another example, during in service 612, one or more illustrative embodiments may be implemented to control the operation of electric motors in a manner that increases the efficiency of electric motors. One or more apparatus embodiments, method embodiments, or a combination thereof may be utilized while aircraft 700 is in service 612 and/or during maintenance and service 614 in FIG. 6. The use of a number of the different illustrative embodiments may substantially expedite the assembly of and/or reduce the cost of aircraft 700.

Thus, in the illustrative examples, electric motor system 102 with electric motor unit 104 and controller 106 in separate physical locations reduce at least one of cost, weight, size, heat generation, or energy use. Electric motor system 102 also may provide for increased flexibility, redundancy, and other features that are not currently possible with current electric motor systems. The separation of controller 106 from electric motor unit 104 allows for electric motor unit 104 to be used in more locations than currently possible.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments.

Of course, although different examples have been described with respect to using electric motors in aircraft, the illustrative embodiments may be implemented for electric motors used in other applications. For example, electric motors in accordance with an illustrative embodiment may be implemented in manufacturing tools, automobiles, spacecraft, satellites, trains, appliances, or other suitable objects. In rockets, for example, the stirrers for the fuel tanks may implement an electric motor system in accordance with an illustrative embodiment. In yet another illustrative example, an electric motor system implemented in accordance with an illustrative embodiment may be used in human implants with at least one of less weight, a smaller size, less heat generation, less energy use, reduced cost, increased flexibility of placement, increased redundancy, as well as other considerations.

In still other illustrative examples, an electric motor system in accordance with an illustrative embodiment is used in a robot, a robotic surgeon, a nanobot, or some other suitable device. For example, in these illustrative implementations, the increased flexibility of placement of electric motor units may be present from the separation of the electric motor units from the controllers. As a result, electric motor units may be used in locations that are currently infeasible because of the size of the electric motor systems.

The description of the different illustrative embodiments has been presented for purposes of illustration and description and is not intended to be exhaustive or limited to the embodiments in the form disclosed. Many modifications and variations will be apparent to those of ordinary skill in the art.

For example, although some illustrative examples have described the electric motor as in brushless direct current electric motor, other illustrative examples may use other types of electric motors. For example, an alternating current (AC) electric motor also may be used in different illustrative examples.

Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a controller configured to
      receive information from an electric motor unit over a wireless communications link between the controller and the electric motor unit,
      identify commands for the electric motor unit from the information received, and
      send the commands identified to the electric motor unit over the wireless communications link;
   a plurality of controllers, including the controller, configured to
      identify the commands for the electric motor unit from the information received; and
   a selector configured to
      select the commands from one of the plurality of controllers, and
      send the commands selected to the electric motor unit over the wireless communications link.

2. The apparatus of claim 1 further comprising:
   the electric motor unit.

3. The apparatus of claim 1, wherein the controller comprises:
   a group of control laws configured to identify the commands for the electric motor unit from the information received.

4. The apparatus of claim 1, wherein the controller further comprises:
   a receiver configured to receive the information from the electric motor unit over the wireless communications link; and
   a transmitter configured to send the commands identified to the electric motor unit over the wireless communications link.

5. The apparatus of claim 4, wherein the electric motor unit comprises:
   an electric motor;
   a transmitter configured to send the information to the controller; and
   a receiver configured to receive the commands from the controller.

6. The apparatus of claim 1 further comprising:
   the plurality of controllers, including the controller, configured to
      receive the information from the electric motor unit over the wireless communications link between the controller and the electric motor unit.

7. The apparatus of claim 6 further comprising:
   the selector configured to
      receive the commands for the electric motor unit from the plurality of controllers.

8. The apparatus of claim 6 further comprising:
a plurality of electric motor units, including the electric motor unit, wherein the plurality of controllers is configured to control operation of a number of electric motor units in the plurality of electric motor units over a plurality of wireless communications links, including the communications link.

9. The apparatus of claim 1, wherein the electric motor unit is selected from one of a brushless electric motor unit, a direct current electric motor, and an alternating current electric motor.

10. The apparatus of claim 1, wherein the controller is an impulse width modulation controller.

11. An electric motor system comprising:
an electric motor unit in a first location;
a controller in a second location, wherein the controller is configured to
  receive information from the electric motor unit over a communications link between the controller and the electric motor unit,
  identify commands for the electric motor unit from the information received, and
  send the commands identified to the electric motor unit over the communications link; and
a plurality of controllers, including the controller, configured to
  identify the commands for the electric motor unit from the information received; and
a selector configured to
  select the commands from one of the plurality of controllers, and
  send the commands selected to the electric motor unit over the communications link.

12. The electric motor system of claim 11, wherein the communications link is selected from one of a wireless communications link, and an optical communications link.

13. A method for operating an electric motor unit, the method comprising:
receiving information from the electric motor unit over a wireless communications link between a controller and the electric motor unit;
identifying commands for the electric motor unit from the information received; and
sending the commands identified to the electric motor unit over the wireless communications link;
identifying, by a plurality of controllers including the controller, the commands for the electric motor unit from the information received;
selecting, by a selector, the commands from one of the plurality of controllers; and
sending, by the selector, the commands selected to the electric motor unit over the wireless communications link.

14. The method of claim 13, wherein identifying the commands for the electric motor unit from the information received comprises:
identifying, by a group of control laws in the controller, the commands for the electric motor unit from the information received.

15. The method of claim 14, wherein a receiver in the controller receives the information from the electric motor unit over the wireless communications link, and a transmitter in the controller sends the commands identified to the electric motor unit over the wireless communications link.

16. The method of claim 14, wherein the electric motor unit comprises an electric motor, a transmitter that sends the information to the controller, and a receiver that receives the commands from the controller.

17. The method of claim 13,
wherein the plurality of controllers, including the controller,
  receives the information from the electric motor unit over the wireless communications link between the controller and the electric motor unit.

18. The method of claim 17 further comprising:
sending the commands from the plurality of controllers and the commands from the electric motor unit to the selector over the wireless communications link.

19. The method of claim 17, wherein the plurality of controllers is configured to control operation of a number of electric motor units in a plurality of electric motor units, including the electric motor unit.

20. The method of claim 13, wherein the electric motor unit is selected from one of a brushless electric motor unit, a direct current electric motor, and an alternating current electric motor.

* * * * *